United States Patent [19]
Sugaya et al.

[11] Patent Number: 6,111,990
[45] Date of Patent: Aug. 29, 2000

[54] DIGITAL-WATERMARK SUPERPOSING APPARATUS AND DIGITAL-WATERMARKER DETECTING APPARATUS

[75] Inventors: Kazumi Sugaya; Takeshi Nakamura; Yoshiaki Moriyama, all of Saitama, Japan

[73] Assignee: Pioneer Electronic Corporation, Tokyo, Japan

[21] Appl. No.: 09/152,294

[22] Filed: Sep. 14, 1998

[30] Foreign Application Priority Data

Sep. 17, 1997 [JP] Japan .................................. 9-252507

[51] Int. Cl.⁷ ............................... G06K 9/36; G06K 9/46
[52] U.S. Cl. ............................................ 382/250; 382/100
[58] Field of Search ..................................... 382/100, 248, 382/250, 251; 380/5, 7, 10

[56] References Cited

U.S. PATENT DOCUMENTS

| | | | |
|---|---|---|---|
| 4,939,515 | 7/1990 | Adelson | 341/51 |
| 5,809,139 | 9/1998 | Girod et al. | 380/5 |
| 5,848,155 | 12/1998 | Cox | 380/4 |
| 5,915,027 | 6/1999 | Cox et al. | 380/54 |
| 6,037,984 | 3/2000 | Isnardi et al. | 348/403 |

FOREIGN PATENT DOCUMENTS

| | | | |
|---|---|---|---|
| 0 766 468 | 4/1997 | European Pat. Off. | H04N 7/08 |
| 0 855 681 | 7/1998 | European Pat. Off. | G06T 11/00 |

OTHER PUBLICATIONS

M.D. Swanson et al: "Object–Based Transparent Video Watermarking" 1997 IEEE First Workshop on Mulitmedia Signal Processing, Jun. 23–25 1997, pp. 369–374, XP002117815.

Swanson et al: "Transparent Robust Image Watermarking", Proceedings of the Singapore International Conference on Image Processing, vol. 3, No. 3, Sep. 16, 1996 pp. 211–214 XP002097961.

Swanson et al: "Multiresolution Video Watermarking Using Perceptual Models and Scene Segmentation" Proceedings of the International Conference on Image Processing ICIP 1998, Santa Barbara, CA, Oct. 26–29, 1997, vol. 2, Oct. 1997 pp. 558–561, XP000669444.

Ruanaidh et al: "Watermarking Digital Images for Copyright Protection" IEE Proceedings: Vision, Image and Signal Processing, vol. 143, No. 4, Aug. 1, 1996 pp. 250–256, XP000627047.

*Primary Examiner*—Phuoc Tran
*Attorney, Agent, or Firm*—Sughrue, Mion, Zinn, Macpeak & Seas, PLLC

[57] ABSTRACT

In a digital-watermark superposing apparatus and a digital-watermark detecting apparatus, a plurality of DCT coefficients for respective frequency components are generated by subjecting video data to a two-dimensional DCT transform for each pixel block consisting of a predetermined number of pixels, and the value of at least one of the DCT coefficients is quantized in accordance with a quantization rule corresponding to the information so as to obtain a quantized DCT coefficient. A two-dimensional inverse DCT transform is performed with respect to the DCT coefficients in which the at least one DCT coefficient thereof is replaced with the quantized DCT coefficient, so as to obtain digital-watermark superposed video data in which the digital watermark corresponding to the information has been superposed on the video data. At this juncture, the digital-watermark superposed video data is selected and outputted concerning a section in which a video pattern due to the video data is not flatter than a predetermined video pattern, while, instead of the digital-watermark superposed video data, the video data is selected and outputted as it is concerning a section in which the video pattern due to the video data is flatter than the predetermined video pattern.

7 Claims, 4 Drawing Sheets

DIGITAL-WATERMARK SUPERPOSING APPARATUS AND DIGITAL-WATERMARKER DETECTING APPARATUS

BACKGROUND OF THE INVENTION

1. Field of the Invention

The present invention relates to a digital-watermark superposing apparatus for superposing on video data a digital watermark which bears information different from the video data and a digital-watermark detecting apparatus for detecting such a digital watermark from video data on which the digital watermark has been superposed.

2. Description of the Related Art

Currently, as optical recording media on which information data can be written, DVD-R and DVD-RAM are being put to practical use, but in putting the DVD-R and the DVD-RAM to practical use, it is necessary to devise measures for preventing illegal copying of video software and the like.

Accordingly, attention is being focused on a technology in which information expressing copywrite information or a copy guard is expressed by a noise-like image pattern called a digital watermark (hereafter referred to as the watermark) which is visually inconspicuous, and video data with this watermark superposed is transmitted or recorded on a recording medium.

However, since the watermark is merely noise with respect to the video data, if an image is displayed by using the video data in which such a watermark is embedded, deterioration in the image quality occurs.

SUMMARY OF THE INVENTION

Accordingly, an object of the present invention is to provide a digital-watermark superposing apparatus and a digital-watermark detecting apparatus which make it possible to superpose a digital watermark bearing desired information on video data while suppressing deterioration in image quality when an image is being displayed.

In accordance with a first aspect of the present invention, there is provided a digital-watermark superposing apparatus for superposing on video data a digital watermark which bears information different from the video data, comprising: a DCT circuit for generating a plurality of DCT coefficients for respective frequency components by subjecting the video data to a two-dimensional DCT transform for each pixel block consisting of a predetermined number of pixels; a quantizer for quantizing a value of at least one of the DCT coefficients in accordance with a quantization rule corresponding to the information so as to obtain a quantized DCT coefficient; an inverse DCT circuit for performing a two-dimensional inverse DCT transform with respect to the DCT coefficients in which the at least one DCT coefficient thereof is replaced with the quantized DCT coefficient, so as to obtain digital-watermark superposed video data in which the digital watermark corresponding to the information has been superposed on the video data; and a selector for selecting and outputting the digital-watermark superposed video data concerning a section in which a video pattern due to the video data is not flatter than a predetermined video pattern, and for selecting and outputting the video data instead of the digital-watermark superposed video data concerning a section in which the video pattern due to the video data is flatter than the predetermined video pattern.

In accordance with a second aspect of the present invention, there is provided a digital-watermark detecting apparatus for detecting a digital watermark from video data on which the digital watermark bearing information has been superposed, comprising: a DCT circuit for generating a plurality of DCT coefficients for respective frequency components by subjecting the video data to a two-dimensional DCT transform for each pixel block consisting of a predetermined number of pixels; means for determining as a quantization error an absolute value of a difference between a value of at least one of the DCT coefficients and a value of a quantized DCT coefficient quantized in accordance with a quantization rule corresponding to the information; statistical processing means for statistically processing the number of times when a value of the quantization error has become a value in a neighborhood of 0; and digital-watermark determining means for determining as a result of the statistical processing whether or not the digital watermark bearing the information has been superposed on the video dada.

In accordance with a third aspect of the present invention, there is provided a digital-watermark detecting apparatus for detecting a digital watermark from video data on which a digital watermark bearing first information and a digital watermark bearing second information have been superposed, comprising: a DCT circuit for generating a plurality of DCT coefficients for respective frequency components by subjecting the video data to a two-dimensional DCT transform for each pixel block consisting of a predetermined number of pixels; means for determining as a quantization error an absolute value of a difference between a value of at least one of the DCT coefficients and a value of a quantized DCT coefficient quantized in accordance with a quantization rule corresponding to the first information; statistical processing means for statistically processing the number of times when the quantization error has become less than a lower limit value of a predetermined dead band region and the number of times when the quantization error has become greater than an upper limit value of the predetermined dead band region; and digital-watermark determining means for determining as a result of the statistical processing whether or not the digital watermark has been superposed on the video data and whether the digital watermark bears the first information or the second information.

DETAILED DESCRIPTION OF THE PREFERRED EMBODIMENTS

Now, a description will be given in more detail of preferred embodiments of the invention with reference to the accompanying drawings.

Figure 1:
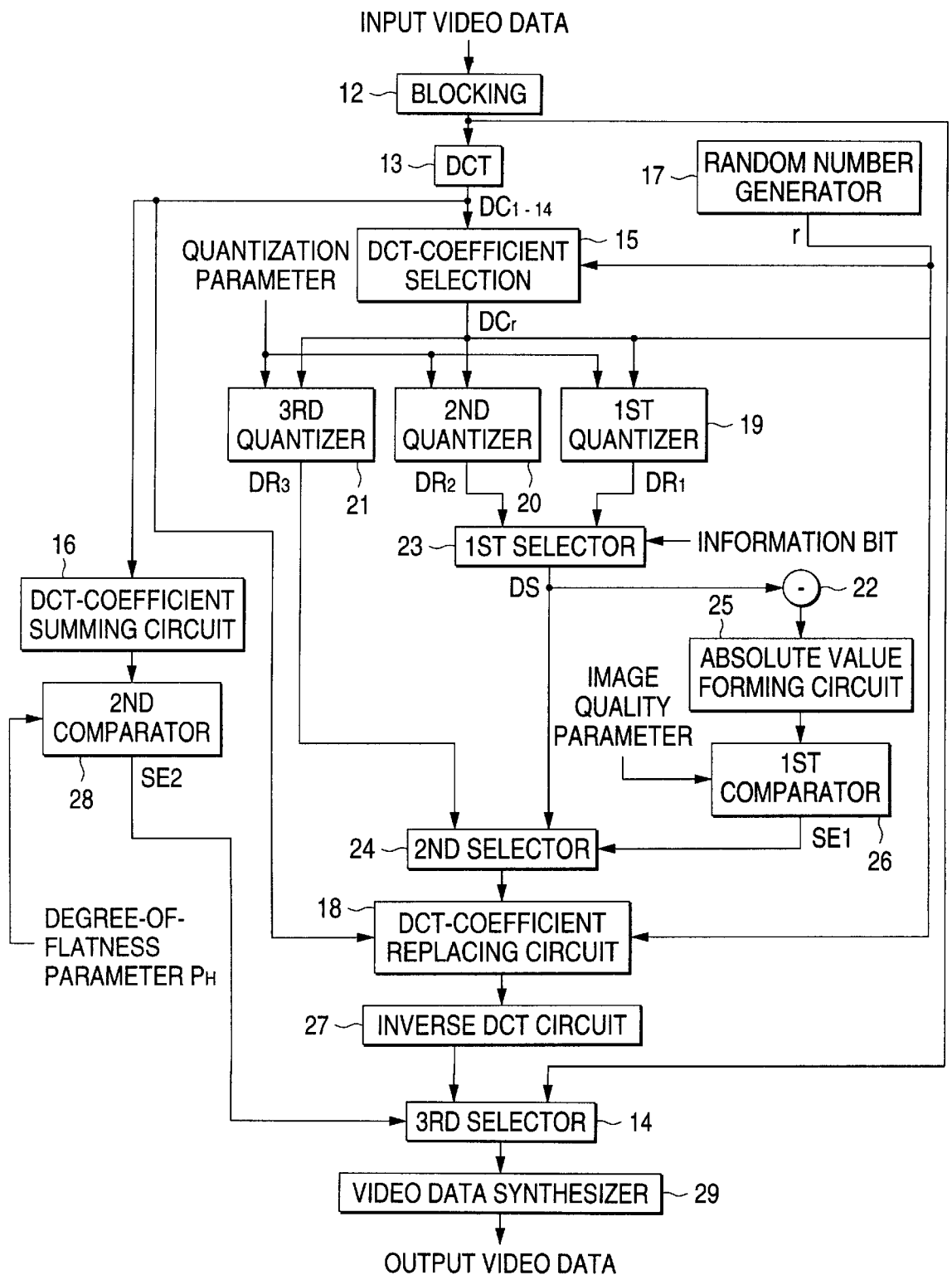
FIG. 1 is a diagram illustrating the configuration of a watermark superposing apparatus in accordance with the present invention.

FIG. 1 is diagram illustrating the configuration of a watermark superposing apparatus for superposing a watermark, which bears information on prevention of copying and the like, on original video data to be recorded on a recording medium.

In FIG. 1, a blocking circuit 12 divides input video data inputted as the aforementioned original video data into pixel data blocks each consisting of 8×8 pixel data, and supplies the same to a discrete cosine transform (DCT) circuit 13 and a third selector 14. The DCT circuit 13 performs two-dimensional DCT operations with respect to such pixel data blocks each consisting of 8×8 pixel data, thereby transforms the same into DCT coefficients $DC_1$ to $DC_{64}$ corresponding to 64-system frequency components, respectively, and supplies these DCT coefficients $DC_1$ to $DC_{64}$ to a DCT-coefficient selecting circuit 15, a DCT-coefficient summing circuit 16, and a DCT-coefficient replacing circuit 18, respectively. A random number generator 17 generates random numbers r within "1" to "64" for each such pixel data block of 8×8 pixel data, and supplies the random numbers r to the DCT-coefficient selecting circuit 15 and the DCT-coefficient replacing circuit 18 which will be described later.

The DCT-coefficient selecting circuit 15 selects among the aforementioned DCT coefficients $DC_1$ to $DC_{64}$ at least one DCT coefficient DCr of the degree indicated by the aforementioned random number r, and supplies the selected coefficient DCr to a first quantizer 19, a second quantizer 20, a third quantizer 21, and a subtractor 22, respectively.

Figure 2A:
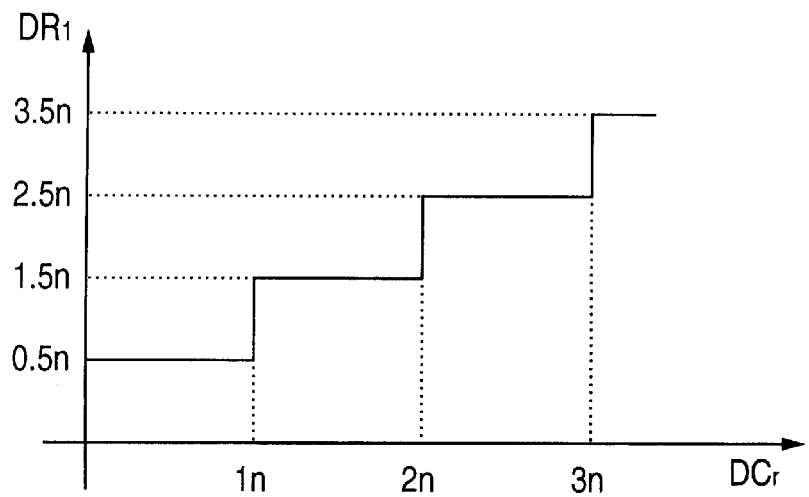
FIGS. 2A to 2C are diagrams illustrating quantization rules for a first quantizer, a second quantizer and a third quantizer, respectively.

The first quantizer 19 supplies to a first selector 23 a first quantized DCT coefficient $DR_1$ which is obtained by quantizing the aforementioned DCT coefficient DCr in accordance with a quantization rule such as the one shown in FIG. 2A. That is, the first quantizer 19 replaces the value of the DCT coefficient DCr which is greater than or equal to $\{k \cdot n\}$ and less than $\{(k+1) \cdot n\}$ with the first quantized DCT coefficient $DR_1$ having a value of $\{(k+1/2) \cdot n\}$.

Figure 2B:
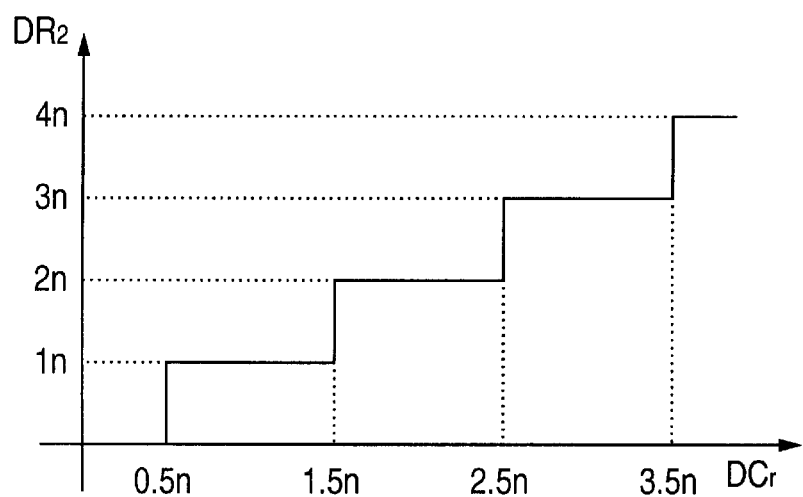

The second quantizer 20 supplies to the first selector 23 a second quantized DCT coefficient $DR_2$ which is obtained by quantizing the aforementioned DCT coefficient DCr in accordance with a quantization rule such as the one shown in FIG. 2B. That is, the second quantizer 20 replaces the value of the DCT coefficient DCr which is greater than or equal to $\{(k+1/2) \cdot n\}$ and less than $\{(k+3/2) \cdot n\}$ with the second quantized DCT coefficient $DR_2$ having a value of $\{(k+1) \cdot n\}$.

Figure 2C:
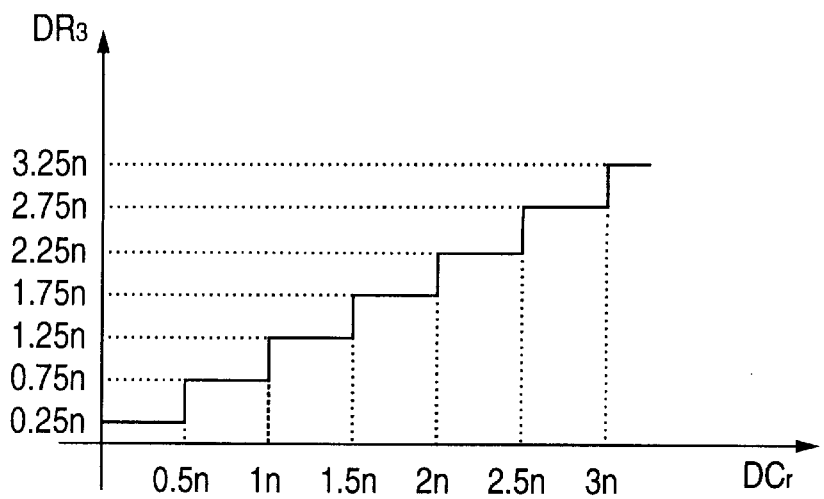

The third quantizer 21 supplies to a second selector 24 a third quantized DCT coefficient $DR_3$ which is obtained by quantizing the aforementioned DCT coefficient DCr in accordance with a quantization rule such as the one shown in FIG. 2C. That is, the third quantizer 21 replaces the value of the DCT coefficient DCr which is greater than or equal to $\{(1/2) \cdot k \cdot n\}$ and less than $\{(1/2)(k+1) \cdot n\}$ with the third quantized DCT coefficient $DR_3$ having a value of $\{(1/2)(k+1/2) \cdot n\}$.

It should be noted that, in the first to third quantizers, the aforementioned n denotes a quantization parameter, and k denotes an integer.

The first selector 23 selects from the first quantized DCT coefficient $DR_1$ and the second quantized DCT coefficient $DR_2$ one which corresponds to an information bit supplied from an unillustrated controller, so as to designate either one of two kinds of watermarks WM1 and WM2 which bear information. The first selector 23 supplies this coefficient as a selected quantized DCT coefficient DS to the subtractor 22 and the second selector 24, respectively. For instance, if the logic level of such an information bit is "0," the first selector 23 selects the second quantized DCT coefficient $DR_2$ supplied from the second quantizer 20, and supplies this coefficient as the aforementioned selected quantized DCT coefficient DS to the subtractor 22 and the second selector 24, respectively. On the other hand, if the logic level of the information bit is "1," the first selector 23 selects the first quantized DCT coefficient $DR_1$ supplied from the first quantizer 19, and supplies this coefficient as the aforementioned selected quantized DCT coefficient DS to the subtractor 22 and the second selector 24, respectively.

The subtractor 22 determines the difference between such a selected quantized DCT coefficient DS and the DCT coefficient DCr, and supplies it as a quantization noise value to an absolute-value forming circuit 25. The absolute-value forming circuit 25 supplies the absolute value of such a quantization noise value to a first comparator 26. If the absolute value of the quantization noise value is higher than an image quality parameter expressing a predetermined image quality, the first comparator 26 supplies a first selected signal SE1 having the logic level "1" to the second selector 24, and if it is lower than the image quality parameter, the first comparator 26 supplies the first selected signal SE1 having the logic level "0" to the second selector 24.

The second selector 24 selects from the selected quantized DCT coefficient DS and the third quantized DCT coefficient $DR_3$ one which corresponds to the logic level of the first selected signal SE1, and supplies this coefficient to the DCT-coefficient replacing circuit 18. For instance, if the logic level of the first selected signal SE1 is "0," the second selector 24 selects the selected quantized DCT coefficient DS supplied from the first selector 23, and supplies it to the DCT-coefficient replacing circuit 18. On the other hand, if the logic level of the first selected signal SE1 is "1," the second selector 24 selects the third quantized DCT coefficient $DR_3$ supplied from the third quantizer 21, and supplies it to the DCT-coefficient replacing circuit 18.

The DCT-coefficient replacing circuit 18 supplies to an inverse DCT circuit 27 64 DCT coefficients in which, of the 64 DCT coefficients $DC_1$ to $DC_{64}$ supplied by the DCT circuit 13, the DCT coefficient of the degree indicated by the aforementioned random number r is replaced with the DCT coefficient (the selected quantized DCT coefficient DS or the third quantized DCT coefficient $DR_3$) supplied from the second selector 24.

The inverse DCT circuit 27 determines video data blocked for each pixel data block of 8×8 pixels by performing a 8×8 two-dimensional inverse DCT operation with respect to the 64 DCT coefficients supplied from the DCT-coefficient replacing circuit 18, and supplies the video data to the third selector 14. At this time, such video data determined by the inverse DCT circuit 27 is the digital-watermark superposed video data in which the watermark has been superposed.

The DCT-coefficient summing circuit 16 determines the sum of the DCT coefficients by adding the respective DCT coefficients $DC_1$ to $DC_{64}$ supplied by the DCT circuit 13, and supplies it to a second comparator 28. If the sum of the DCT coefficients is greater than a degree-of-flatness parameter $P_H$ which represents a predetermined degree of flatness of an image, the second comparator 28 supplies a selected signal SE2 of the logic level "1" to the third selector 14, and if it is less than the degree-of-flatness parameter $P_H$, the second comparator 28 supplies the selected signal SE2 of the logic level "0" to the third selector 14.

Between the input video data blocked into the pixel data blocks each consisting of 8×8 pixels by the blocking circuit 12 and the watermark-superposed video data obtained by the inverse DCT circuit 27, the third selector 14 selects one corresponding to the logic level of the second selected signal, and supplies it to a video data synthesizer 29. For example, if the logic level of the second selected signal SE2 is "0," the third selector 14 selects the watermark-nonsuperposed video data supplied from the blocking circuit 12, and supplies it to the video data synthesizer 29. On the other hand, if the logic level of the second selected signal SE2 is "1," the third selector 14 selects the watermark-superposed video data supplied from the inverse DCT circuit 27, and supplies it to the video data synthesizer 29.

The video data synthesizer 29 rearranges the video data supplied from the third selector 14, i.e., the video data blocked into the pixel data blocks each consisting of 8×8 pixels, at positions corresponding to display lines of the screen so as to be restored into a normal video data format before the video data is outputted. This output video data is recorded on a recording medium after being subjected to predetermined data compression encoding and demodulation, for instance.

Hereafter, a description will be given of the operation of the above-described watermark superposing apparatus shown in FIG. 1.

First, the DCT circuit 13 transforms the video data into the 64 DCT coefficients $DC_1$ to $DC_{64}$ corresponding to the frequency components in units of pixel data blocks each consisting of 8×8 pixels. The DCT-coefficient selecting circuit 15 randomly selects at least one of these 64-system DCT coefficients. By quantizing the selected DCT coefficient in accordance with different quantization rules such as those shown in FIGS. 2A and 2B, the first quantizer 19 and the second quantizer 20 replaces such a DCT coefficient with another value.

Namely, the first quantized DCT coefficient $DR_1$ quantized by the first quantizer 19 is replaced with one of the following values, as shown in FIG. 2A.

$$\{0.5n, 1.5n, 2.5n, 3.5n, \ldots, (k-1/2)n\} \qquad (1)$$

where k is an integer, and n is a quantization parameter.

Meanwhile, the second quantized DCT coefficient $DR_2$ quantized by the second quantizer 20 is replaced with one of the following values, as shown in FIG. 2B.

$$\{1n, 2n, 3n, 4n, \ldots, kn\} \qquad (2)$$

where k is an integer, and n is a quantization parameter.

At this time, due to the difference in the quantization as described above, it is possible to obtain two kinds of watermarks WM1 and WM2 which bear information. The first selector 23 selects from these two kinds of watermarks WM1 and WM2 either the first quantized DCT coefficient $DR_1$ or the second quantized DCT coefficient $DR_2$ so as to obtain the watermark corresponding to the information bit. Such a quantized DCT coefficient selected by the first selector 23 is replaced with a corresponding DCT coefficient among the 64 DCT coefficients $DC_1$ to $DC_{64}$ by the DCT-coefficient replacing circuit 18.

Thus, at least one of the 64 DCT coefficients $DC_1$ to $DC_{64}$ is replaced with another value by being quantized in accordance with the quantization rule such as the one shown in FIGS. 2A or 2B. Next, by subjecting the DCT coefficients in which, of the 64 DCT coefficients $DC_1$ to $DC_{64}$ supplied by the DCT circuit 13, at least one DCT coefficient is replaced with another value to a two-dimensional inverse DCT operation by the inverse DCT circuit 27, video data is obtained in which components of noise (of a measure which is visually inconspicuous) are superposed on the original video data. These noise components constitute the watermark as described above. At this time, the noise component superposed on the video data by using the first quantized DCT coefficient $DR_1$ is the watermark WM1, and the noise component superposed on the video data by using the second quantized DCT coefficient $DR_2$ is the watermark WM2.

Such video data on which the watermark WM1 or WM2 has been superposed is outputted through the third selector 14 and the video data synthesizing circuit 29.

However, in a case where it is determined through the subtractor 22, the absolute-value forming circuit 25, and the first comparator 26 in FIG. 1 that there is a possibility that the image data with the watermark WM1 or WM2 superposed declines in its image quality to a level below a predetermined image quality parameter, the following processing is effected.

That is, at this time, the second selector 24 supplies instead of the aforementioned selected quantized DCT coefficient DS the third quantized DCT coefficient $DR_3$ quantized by the third quantizer 21 to the DCT-coefficient replacing circuit 18. Here, as shown in FIG. 2C, in accordance with the quantization rule for the third quantizer 21, the third quantized DCT coefficient $DR_3$ is replaced with one of the following:

$$\{0.25n, 0.75n, 1.25n, 1.75n, \ldots, (1/2k-1/4)n\} \qquad (3)$$

where k is an integer, and n is a quantization parameter.

In other words, the third quantized DCT coefficient $DR_3$ assumes an intermediate value between the first quantized DCT coefficient $DR_1$ and the second quantized DCT coefficient $DR_2$. At this time, the noise component which is obtained when such a third quantized DCT coefficient $DR_3$ is used does not take on a meaning as information as with the watermarks WM1 and WM2, but it can be said that the video data on which this noise component has been superposed is capable of maintaining a predetermined image quality.

That is, the arrangement provided is such that in a case where it is determined that if the watermark superposition is effected by using the first quantized DCT coefficient $DR_1$ or the second quantized DCT coefficient $DR_2$, its image quality deteriorates to a level below a predetermined image quality, the third quantized DCT coefficient $DR_3$ which is capable of maintaining a predetermined image quality is used instead of the first quantized DCT coefficient $DR_1$ or the second quantized DCT coefficient $DR_2$.

It should be noted that such a third quantized DCT coefficient $DR_3$ belongs to a dead band region which is not subject to detection during watermark detection which will be described later.

Thus, since the watermark-superposed video data is blocked into each 8×8 pixels as described above, this video data is supplied to the video data synthesizer 29 via the third selector 14, which in turn cancels and the blocking and outputs the same.

However, at this time, if it is determined by the configuration including the DCT-coefficient summing circuit 16 and the second comparator 28 that the video pattern of the inputted video data is relatively flat, the third selector 14 outputs the inputted video data as it is instead of the watermark-superposed video data obtained by the two-dimensional inverse DCT operation.

Namely, if the watermark is superposed in a flat video pattern, the watermark constituting noise as described above becomes visually conspicuous, so that the watermark is not superposed on a portion which corresponds to a flat video pattern in the video data.

According to such a watermark superposing method, it becomes possible to minimize the deterioration in the image quality when the image is displayed.

Next, a description will be given of a watermark detecting apparatus for detecting a watermark from video data on which the watermark has been superposed by the apparatus shown in FIG. 1.

Figure 3:
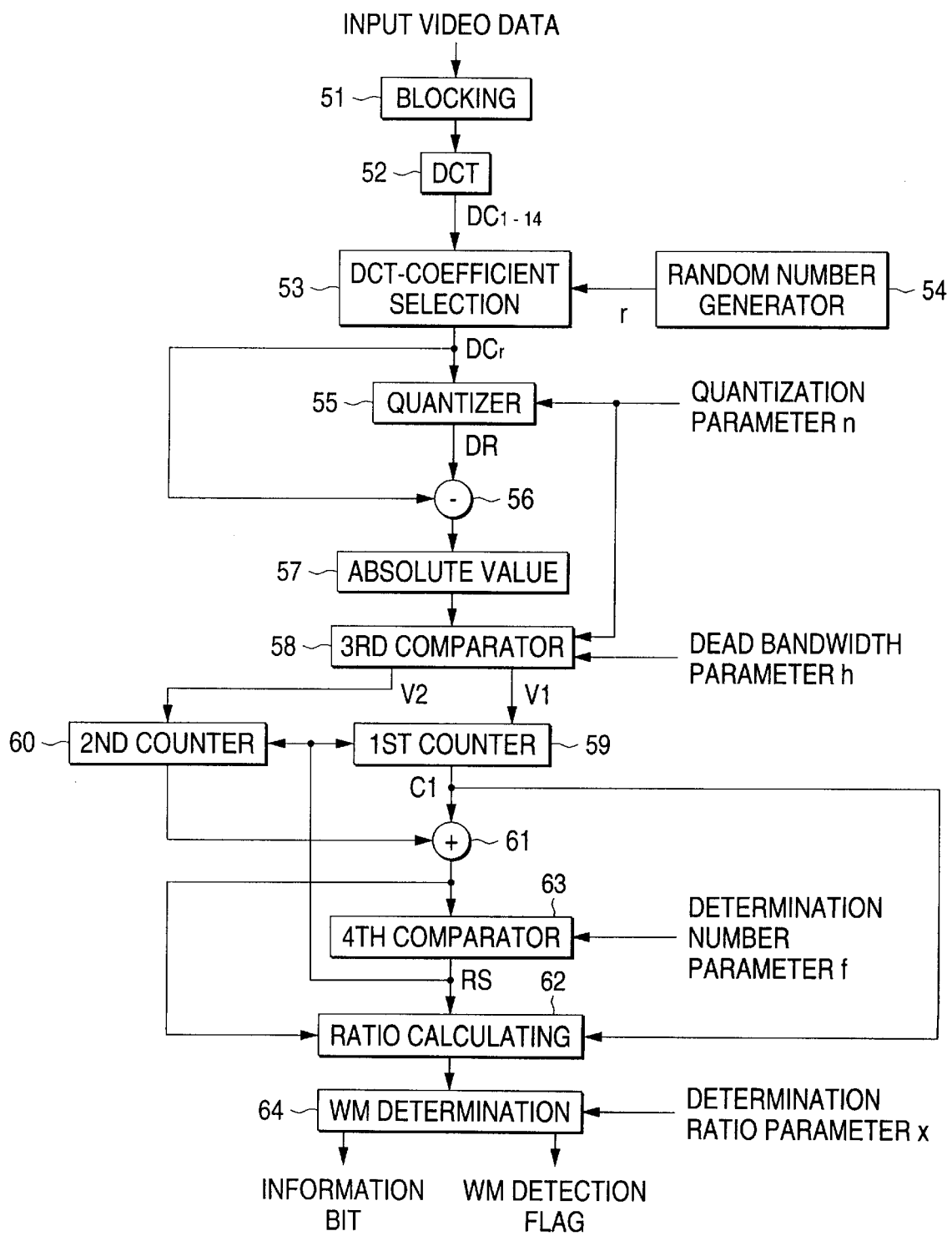
FIG. 3 is a diagram illustrating the configuration of a watermark detecting apparatus in accordance with the present invention.

FIG. 3 is a diagram illustrating the configuration of such a watermark detecting apparatus.

In FIG. 3, a blocking circuit 51 divides the input video data generated by the watermark superposing apparatus shown in FIG. 1 into pixel data blocks each having 8×8 pixel data, and supplies the same to a discrete cosine transform (DCT) circuit 52. The DCT circuit 52 determines DCT coefficients $DC_1$ to $DC_{64}$ respectively corresponding to the frequency components by performing two-dimensional DCT operations with respect to the pixel data blocks each having 8×8 pixel data, and supplies the same to a DCT-coefficient selecting circuit 53. A random number generator 54 generates random numbers r within "1" to "64" for each such pixel data block of 8×8 pixel data, and supplies the random numbers r to the DCT-coefficient selecting circuit 53. It should be noted that the random number generator 54 generates the random numbers r by the same random number generating algorithm as that for the random number generator 17 in the watermark superposing apparatus shown in FIG. 1.

The DCT-coefficient selecting circuit 53 selects among the aforementioned DCT coefficients $DC_1$ to $DC_{64}$ at least one coefficient DCr of the degree indicated by the aforementioned random number r, and supplies the selected coefficient DCr to a quantizer 55 and a subtractor 56, respectively. The quantizer 55 quantizes the DCT coefficient DCr in accordance with a quantization rule such as the one shown in FIG. 2A, and supplies to the subtractor 56 a quantized DCT coefficient DR which is obtained at that time. That is, the quantizer 55 quantizes the value of the DCT coefficient DCr which is greater than or equal to {kΣn} and less than {(k+1)Σn} into the quantized DCT coefficient DR having a value of (k+1/2)Σn, and supplies it to the subtractor 56. It should be noted that n denotes a quantization parameter, and k denotes an integer.

The subtractor 56 determines a quantization noise value on the basis of the difference between such a quantized DCT coefficient DR and the DCT coefficient DCr, and supplies the same to an absolute-value forming circuit 57. The absolute-value forming circuit 57 supplies the absolute value of such a quantization noise value to a third comparator 58.

If the absolute value of such a quantization noise value is less than a lower limit value of a region shown by a dead bandwidth parameter h, the third comparator 58 tentatively determines that the watermark superposed on the video data is the aforementioned watermark WM1, and supplies a 1-count-up signal U1 to a first counter 59 at that time. Meanwhile, if the absolute value of such a quantization noise value is greater than an upper limit value of the region shown by the dead bandwidth parameter h, the third comparator 58 tentatively determines that the watermark superposed on the video data is the aforementioned watermark WM2, and supplies a 1-count-up signal U2 to a second counter 60 at that time.

Figure 4:
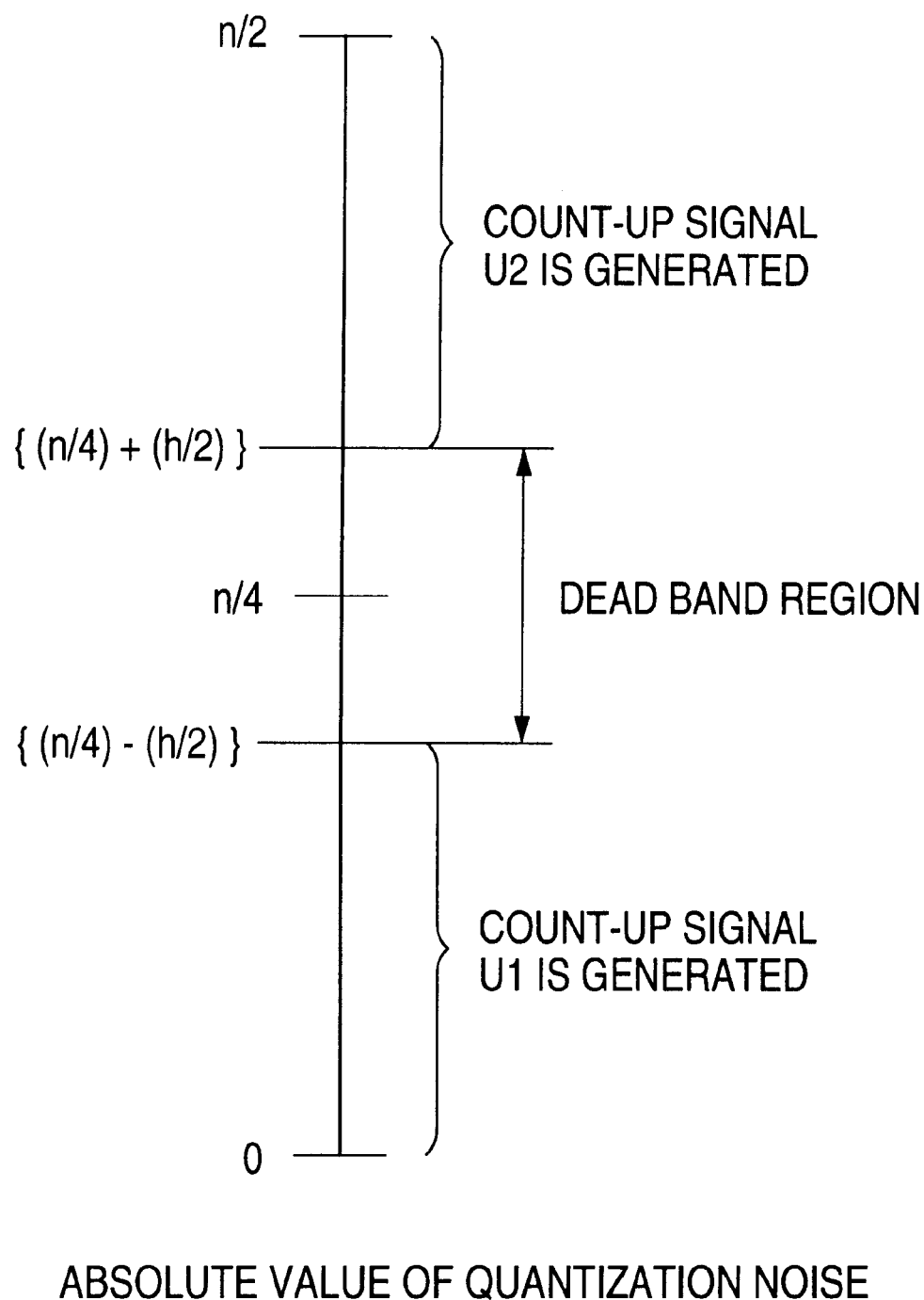
FIG. 4 is a diagram illustrating the relationship of correspondence between the absolute value of quantization noise and its dead band region on the one hand, and 1-count-up signals U1 and U2, on the other.

FIG. 4 is a diagram illustrating an example of the relationship of correspondence between the absolute value of such quantization noise and its dead band region on the one hand, and the 1-count-up signals U1 and U2 on the other.

As shown in FIG. 4, the upper limit value and the lower limit value of the dead band region are expressed by Upper limit value=$\{(n/4)+(h/2)\}$ Lower limit value=$\{(n/4)-(h/2)\}$ (4)

where n is a quantization parameter, and h is a dead bandwidth parameter.

Each time the 1-count-up signal U1 is supplied to the first counter 59, the first counter 59 increments its count value by 1, and supplies such a count value to an adder 61 and a ratio calculating circuit 62, respectively, as a count value C1. In addition, when a reset signal RS is supplied to the first counter 59 from a fourth comparator 63 which will be described later, the first counter 59 resets the count value C1 to "0".

Each time the 1-count-up signal U2 is supplied to the second counter 60, the second counter 60 increments its count value by 1, and supplies such a count value to the adder 61 as a count value C2. In addition, when the reset signal RS is supplied to the second counter 60 from the fourth comparator 63 which will be described later, the second counter 60 resets the count value C2 to "0".

The adder 61 supplies the result of addition of the count values C1 and C2, i.e., (C1+C2), to the fourth comparator 63 and the ratio calculating circuit 62, respectively.

When the result of addition (C1+C2) has become equal to a predetermined determination number parameter f, the fourth comparator 63 generates the aforementioned reset signal RS, and supplies it to the first counter 59, the second counter 60, and the ratio calculating circuit 62, respectively.

The ratio calculating circuit 62 determines the ratio H between the count value C1 and the result of addition (C1+C2) of the count values C1 and C2 in response to the reset signal RS as shown below, and supplies it to a WM (watermark) determination circuit 64.

Ratio H=$C1/(C1+C2)$ (5)

If the aforementioned ratio H is a value greater than or equal to a predetermined determination ratio parameter x, the WM determination circuit 64 outputs a WM detection flag at the logical level of "1" which indicates that the watermark is superposed on the video data. Further, at that time the WM determination circuit 64 outputs an information bit at the logical level of "0" which indicates that the watermark superposed on the video data is the watermark WM1. Meanwhile, if the aforementioned ratio H is a value less than or equal to (1–the determination ratio parameter x), the WM determination circuit 64 outputs a WM detection flag at the logical level of "1" indicating that the watermark is superposed on the video data, and also outputs the information bit at the logical level of "1" which indicates that the watermark superposed on the video data is the watermark WM2. For example, in cases where these watermarks are used for copying prevention, definitions are so given that the watermark WM1 indicates "COPYING PROHIBITED," and the watermark WM2 indicates "MAY BE COPIED FREELY."

If the aforementioned ratio H does not fall under either condition described above, the WM determination circuit 64 outputs a WM detection flag at the logical level of "0" which indicates that the watermark is not superposed on the video data.

Hereafter, a description will be given of the operation of the watermark detecting apparatus shown in FIG. 3.

First, through the configuration comprising the blocking circuit 51, the DCT circuit 52, the DCT-coefficient selecting circuit 53, and the random number generator 54, the DCT operation is performed with respect to the input video data blocked for each 8×8 pixels, and at least one DCT coefficient DCr is randomly selected from the 64 DCT coefficients $DC_1$ to $DC_{64}$ obtained at that juncture. It should be noted that the random number generating algorithm generated by the random number generator 54 is the same as that for the random number generator 17 in the watermark superposing apparatus shown in FIG. 1. Accordingly, the DCT coefficient DCr selected by the DCT-coefficient selecting circuit 53 is the quantized DCT coefficient quantized by one of the first to third quantizers 19 to 20 in the watermark superposing apparatus.

Next, the configuration comprising the quantizer 55, the subtractor 56, and the absolute-value forming circuit 57 quantizes such a DCT coefficient DCr in accordance with the quantization rule such as the one shown in FIG. 2A, and determines the absolute value of a quantization error occurring due to that quantization. At that juncture, if the aforementioned DCT coefficient DCr is the quantized DCT coefficient quantized by the first quantizer 19, i.e., one quantized in accordance with the quantization rule such as the one shown in FIG. 2A, the absolute value of the quantization error determined by such a quantized DCT coefficient becomes a value in the neighborhood of "0." Further, if the aforementioned DCT coefficient DCr is the quantized DCT coefficient quantized by the second quantizer 20, i.e., one quantized in accordance with the quantization rule such as the one shown in FIG. 2B, the aforementioned absolute value of the quantization error becomes a value in the neighborhood of "n/2." Furthermore, if the aforementioned DCT coefficient DCr is the quantized DCT coefficient quantized by the third quantizer 21, i.e., one quantized in accordance with the quantization rule such as the one shown in FIG. 2C, the aforementioned absolute value of the quantization error becomes a value in the neighborhood of "n/4."

By making a comparison as to whether such an absolute value of the quantization error is a value close to "0" or "n/2" as described above, the third comparator 58 tentatively determines the type of watermark superposed on the video data, i.e., whether the watermark is the watermark WM1 or WM2. To effect such a comparison, the third comparator 58 uses the upper limit value and the lower limit value of the dead band region, such as the one shown in FIG. 4, as thresholds of its criteria. This is because if the absolute value of the quantization error is a value in the neighborhood of "n/4," i.e., an intermediate value between "0" and "n/2," i.e., a value remote from both "0" and "n/2," it is considered that the reliability of the data is low to determine that absolute value of the quantization error as being classified as either "0" or "n/2." Namely, in effecting the tentative determination of the type of watermark on the basis of the absolute value of the quantization error, if the absolute value of the quantization error falls within the dead band region, such an absolute value of the quantization error is not made subject to determination. Accordingly, also in the case where the aforementioned DCT coefficient DCr is the one quantized by the third quantizer 21 in FIG. 1, the case is not made subject to determination.

According to such a measure, since the determination of the watermark is made by only the highly reliable data, it is possible to improve the accuracy with which the watermark is detected.

Thus, in accordance with the configuration described above, it is possible to tentatively determine whether the watermark superposed on each data block of 8×8 pixels in the video data is the watermark WM1 or the watermark WM2.

However, in the watermark superposing apparatus shown in FIG. 1, watermarks are not superposed on all the sections of the video data, as described above. Accordingly, the result of tentative determination of the watermark obtained during the section where the watermark is not superposed becomes erroneous.

Accordingly, in the watermark superposing apparatus shown in FIG. 3, through the configuration comprising the first counter 59, the second counter 60, the adder 61, the fourth comparator 63, the ratio calculating circuit 62, and the WM determination circuit 64, a final determination of the watermark is made by effecting statistical processing using the cumulative number of the blocks which were tentatively determined to be the watermark WM1 (count value C1) and the cumulative number of the blocks which were tentatively determined to be the watermark WM2 (count value C2).

Namely, first, through the calculation $$\text{Ratio } H = C1/(C1+C2) \qquad (6)$$

a determination is made of the ratio H of the cumulative number of the blocks which were tentatively determined to be the watermark WM1 (count value C1) to the sum (C1+C2) of the cumulative number of the blocks which were tentatively determined to be the watermark WM1 (count value C1) and the cumulative number of the blocks which were tentatively determined to be the watermark WM2 (count value C2).

At this juncture, if such a ratio H is a value greater than or equal to a predetermined determination ratio parameter x, it can be determined that the watermark WM1 is superposed on the video data, and if the ratio H is a value less than or equal to (1−determination ratio parameter x), it can be determined that the watermark WM2 is superposed.

Further, if the aforementioned ratio H is a value less than the predetermined determination ratio parameter x and greater than (1−determination ratio parameter x), it can be determined that the watermark WM2 is not superposed on the video data.

Therefore, in accordance with the watermark detecting apparatus shown in FIG. 3, even if the section where the watermark is superposed in the video data is not known, it becomes possible to detect in such video data the section where the watermark is present, and clarify its type.

It should be noted that, in the watermark superposing apparatus shown in FIG. 1 and the watermark detecting apparatus shown in FIG. 3, the data subject to superposition of the watermark is the video data, but it may be audio data.

What is claimed is:

1. A digital-watermark superposing apparatus for superposing on video data a digital watermark which bears information different from the video data, comprising:

a DCT circuit for generating a plurality of DCT coefficients for respective frequency components by subjecting the video data to a two-dimensional DCT transform for each pixel block consisting of a predetermined number of pixels;

a quantizer for quantizing a value of at least one of the DCT coefficients in accordance with a quantization rule corresponding to the information so as to obtain a quantized DCT coefficient;

an inverse DCT circuit for performing a two-dimensional inverse DCT transform with respect to the DCT coefficients in which the at least one DCT coefficient thereof is replaced with the quantized DCT coefficient, so as to obtain digital-watermark superposed video data in which the digital watermark corresponding to the information has been superposed on the video data; and a selector for selecting and outputting the digital-watermark superposed video data concerning a section in which a video pattern due to the video data is not flatter than a predetermined video pattern, and for selecting and outputting the video data instead of the digital-watermark superposed video data concerning a section in which the video pattern due to the video data is flatter than the predetermined video pattern.

2. The digital-watermark superposing apparatus according to claim 1, wherein a quantization error due to the quantized DCT coefficient is greater than a predetermined value, said inverse DCT circuit effects the two-dimensional inverse DCT transform with respect to the DCT coefficients in which a value of at least one DCT coefficient thereof is replaced with a quantized DCT coefficient quantized in according to another quantization rule different from the quantization rule, so as to obtain the digital-watermark superposed video data.

3. A digital-watermark detecting apparatus for detecting a digital watermark from video data on which the digital watermark bearing information has been superposed, comprising:

a DCT circuit for generating a plurality of DCT coefficients for respective frequency components by subjecting the video data to a two-dimensional DCT transform for each pixel block consisting of a predetermined number of pixels;

means for determining as a quantization error an absolute value of a difference between a value of at least one of the DCT coefficients and a value of a quantized DCT coefficient quantized in accordance with a quantization rule corresponding to the information;

statistical processing means for statistically processing the number of times when a value of the quantization error has become a value in a neighborhood of 0; and digital-watermark determining means for determining as a result of the statistical processing whether or not the digital watermark bearing the information has been superposed on the video data.

4. The digital-watermark detecting apparatus according to claim 3, wherein said statistical processing means determines as the result of the statistical processing a ratio between the number of times when the value of the quantization error has become the value in the neighborhood of 0 and a total number of the pixel blocks, and wherein if the ratio is greater than a predetermined ratio, said digital-watermark determining means determines that the digital watermark bearing the information has been superposed on the video data.

5. A digital-watermark detecting apparatus for detecting a digital watermark from video data on which a digital watermark bearing first information and a digital watermark bearing second information have been superposed, comprising:

a DCT circuit for generating a plurality of DCT coefficients for respective frequency components by subjecting the video data to a two-dimensional DCT transform for each pixel block consisting of a predetermined number of pixels;

means for determining as a quantization error an absolute value of a difference between a value of at least one of the DCT coefficients and a value of a quantized DCT coefficient quantized in accordance with a quantization rule corresponding to the first information;

statistical processing means for statistically processing the number of times when the quantization error has become less than a lower limit value of a predetermined dead band region and the number of times when the quantization error has become greater than an upper limit value of the predetermined dead band region; and digital-watermark determining means for determining as a result of the statistical processing whether or not the digital watermark has been superposed on the video data and whether the digital watermark bears the first information or the second information.

6. The digital-watermark detecting apparatus according to claim 5, wherein said statistical processing means determines a ratio of the number of times when the quantization error has become less than the lower limit value of the predetermined dead band region to a sum of the number of times when the quantization error has become less than the lower limit value of the predetermined dead band region and the number of times when the quantization error has become greater than the upper limit value of the predetermined dead band region, and said statistical processing means sets the ratio as the result of the statistical processing, and wherein if the ratio is greater than or equal to a predetermined ratio, said digital-watermark determining means determines that the digital watermark bearing the first information has been superposed on the video data, whereas if the ratio is less than or equal to a value of (1−the predetermined ratio), said digital-watermark determining means determines that the digital watermark bearing the second information has been superposed on the video data.

7. The digital-watermark detecting apparatus according to claim 6, wherein if the ratio is less than the predetermined ratio and greater than (1−the predetermined ratio), said digital-watermark determining means determines that the digital watermark is not superposed on the video data.

* * * * *